(No Model.)

E. A. SPERRY & G. E. MILLS.
AUTOMATIC REGULATOR FOR DYNAMO ELECTRIC MACHINES.

No. 513,062. Patented Jan. 16, 1894.

Witnesses
Wm. F. Henning
Wm. N. Rheem

Inventors
Elmer A. Sperry
George E. Mills
by Buckingham & Ewart Attorneys

UNITED STATES PATENT OFFICE.

ELMER A. SPERRY, OF CLEVELAND, OHIO, AND GEORGE E. MILLS, OF RAVENSWOOD, ILLINOIS.

AUTOMATIC REGULATOR FOR DYNAMO-ELECTRIC MACHINES.

SPECIFICATION forming part of Letters Patent No. 513,062, dated January 16, 1894.

Application filed April 25, 1892. Renewed December 7, 1893. Serial No. 493,049. (No model.)

*To all whom it may concern:*

Be it known that we, ELMER A. SPERRY, residing at Cleveland, Ohio, and GEORGE E. MILLS, residing at Ravenswood, in the county of Cook and State of Illinois, citizens of the United States, have invented a new and useful Improvement in Automatic Regulators for Electric Machines, of which the following is a specification.

This invention relates to regulators for electric machines, and it consists in details and mechanism for automatically rotating the field magnets of a dynamo so as to regulate the current generated in accordance with the requirements of the work-circuit.

It further consists in a moving field, stationary brushes and mechanism for moving such field.

Other details are also shown in connection therewith.

Figure 1:
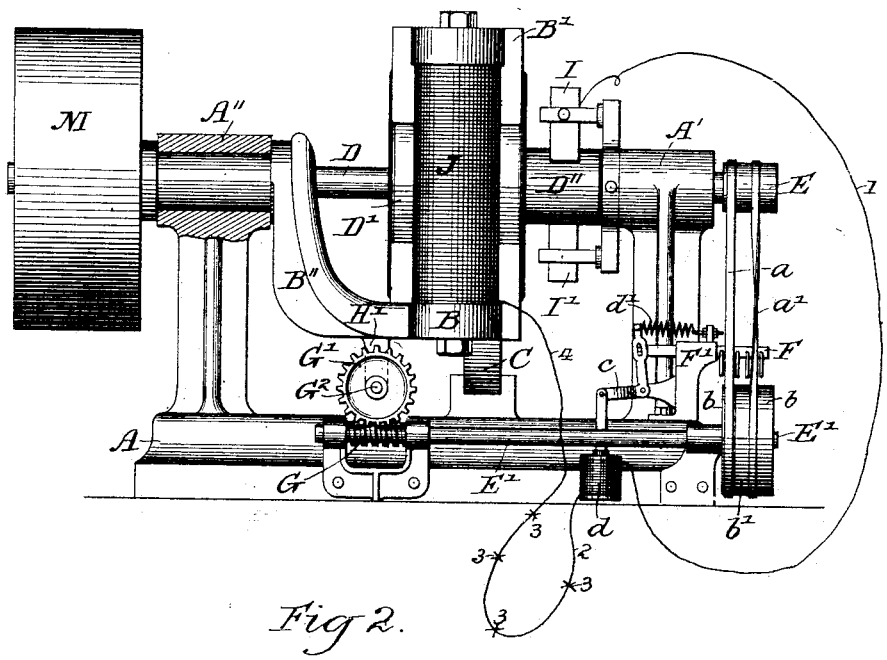
Figure 2:
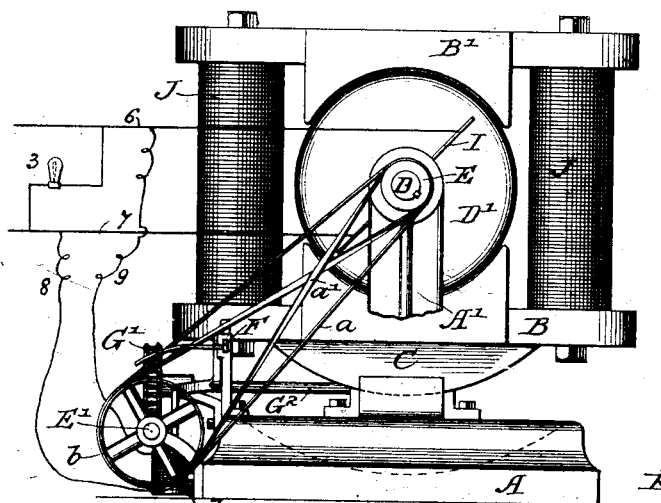
Figure 3:
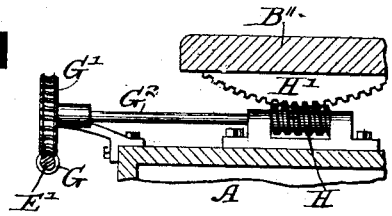

In the drawings Figure 1 represents a side elevation of the machine. Fig. 2 represents an end elevation of the machine; Fig. 3 a detail view of a portion of the regulating mechanism.

Similar letters and figures of reference indicate like parts throughout the several views.

A represents a base plate having two journal bearings A' and A''. A Manchester type dynamo with pole pieces B and B' is mounted upon the base so as to rotate the pole piece B having an arm B'' formed upon it and extending within the journal bearing A''. For further guide and support of the field circular slide C is employed. The armature shaft D connects the pulley with the armature D', which may be of any of the well known types. Commutator D'' is mounted thereon and connected to the armature in the usual way. A pulley E secured to the end of the armature shaft is connected to shaft E' by straight and cross belts $a$ and $a'$. On the shaft E' are two outer loose pulleys $b$ $b$ and an inner tight pulley $b'$. A "belt shipper" F works in guide F' and is controlled by bell crank lever $c$ and magnet $d$ with spring $d'$ connected to it, which may be adjustable in any of the usual ways. The shaft E' bears also a worm G meshing with a worm gear G' borne on shaft G''. On shaft G'' is worm H meshing with worm rack H' which is secured to the moving magnet system of the dynamo.

The circuits of the machine commencing with brushes I are through wires 1, magnet $d$, wires 2, translating device 3, 3, 3, &c., wires 4 to magnet spools J J, thence by wire to brush I'. It will be readily understood that magnet $d$ would be in a shunt with the machine used as a constant potential machine. This is illustrated in Fig. 2 where wires 6 and 7 come directly from the brushes, and branch wires 8 and 9 lead to the magnet $d$, or the fields J may be separately excited or may consist of permanent magnets without interfering in the least with the operation of the machine under this invention.

The use and operation of the device are as follows: The power being applied to the pulley M the rotation of the armature generates the current in the usual way, which, when of the right intensity by action of the magnet $d$ is enabled to balance the pull of the spring $d'$ and hold the belts $a$ and $a'$ upon their respective pulleys $b$ $b$ on shaft E'. However, should this intensity be decreased for instance by addition of translating devices upon the circuit, additional demand upon the exterior circuit of any nature whatsoever, this might also occur by the decrease in speed of the dynamo, the spring $d'$ would raise the bell crank lever arm $c$ thrusting to the right the belt shipper F causing the belt $a$ to ride upon the pulley $b'$ thereby rotating shaft E', and by intermediate connections rotating the field of the machine to a position more favorable for generation of current, as will be readily understood in the art. Should an increase of intensity in magnet $d$ take place the reverse of this action would cause reverse movement of the magnetic field system, as will be readily understood, the rotation bringing the region of greater generating capacity of the commutator away from the brushes so that less current would be collected, and this process would go forward until the balance was again maintained between the attraction of the magnet $d$ and the spring $d'$.

It will readily be understood that the same system of regulation can be used with a dynamo machine whether used either as a motor or generator.

We do not wish to limit ourselves to the particular construction of the field magnets, the rotator or any of the parts shown herein.

It is evident that magnet $d$ could be dispensed with and in lieu thereof the magnetism of the field or armature of the machine be employed, as set forth in prior patent, No. 398,668, dated February 26, 1889.

What we claim as new, and desire to secure by Letters Patent, is—

1. In an electric machine, rotating magnet coils and frame constituting the field of the machine, a rotator therefor, a revolving part carrying the armature, and a connection from the revolving armature or part to the rotator.

2. In an electric machine, a rotating field magnet system, mechanism for rotating such field, a power driven actuating device for such mechanism, and a responsive device responsive to the variations in electric current to control the actuating device substantially for the purpose specified.

3. In an electric machine, a rotating armature, rotating magnet coils and frame constituting the field of the machine, a power-actuated rotator therefor, in combination with a responsive device responsive to the variations in electric current generated by the machine for actuating the rotator.

4. In an electric machine, a rotating field magnet system, a rotator therefor, connecting mechanism from the field magnet system to the rotator, in combination with stationary commutator brushes for such machine.

5. In a dynamo, a base frame, journal brackets rising therefrom supporting the armature shaft and also supporting a gudgeon extending from the field magnet of such machine permitting of rotation of the field magnet system in one only of the journals, substantially as specified.

6. In a dynamo, a base frame, journal brackets rising therefrom supporting the armature shaft and also supporting a gudgeon extending from the field magnet of such machine, and an armature journal internal to the gudgeon connected to the field, substantially as shown, permitting of rotation of the field magnet system in one only of the journals.

7. In a dynamo, a base frame, journal brackets rising therefrom supporting the armature shaft and also supporting a gudgeon extending from the field of such machine, and a segmental support on the base frame for supporting such field.

8. In a dynamo, a base frame, a magnetic system consisting of a pair of pole pieces, a projection extending from the pole piece of one polarity to a journal concentric with the armature shaft permitting of rotation of the field magnet system substantially as specified.

ELMER A. SPERRY.
GEO. E. MILLS.

Witnesses:
WM. F. HENNING,
ARTHUR F. DURAND.